June 7, 1932.   R. B. M. BENNETT   1,862,172
SPRING EXPANDER
Filed June 10, 1931
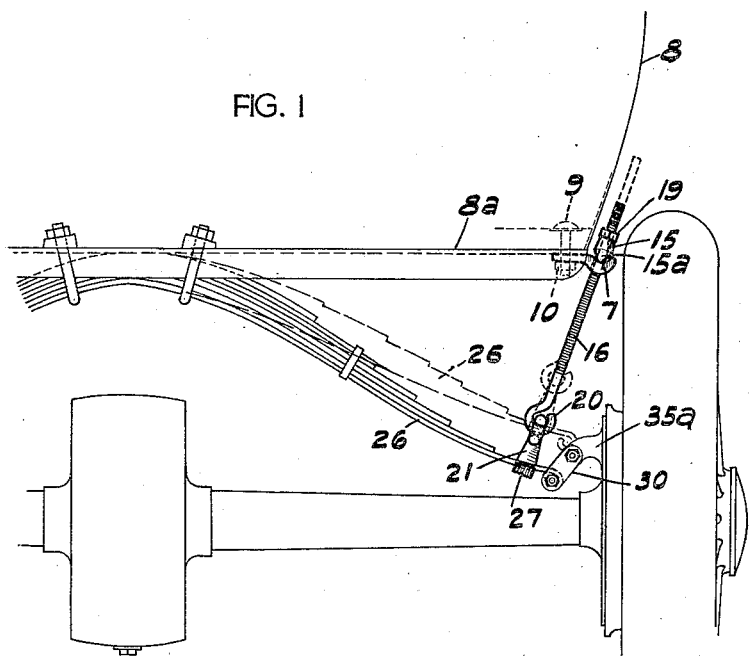
FIG. 1
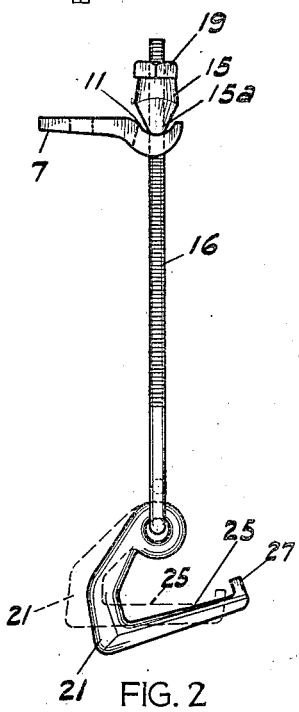
FIG. 2
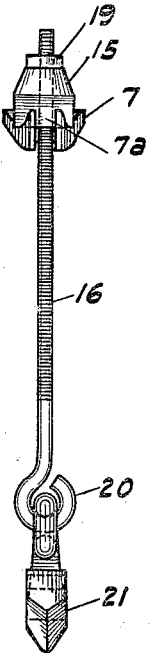
FIG. 3
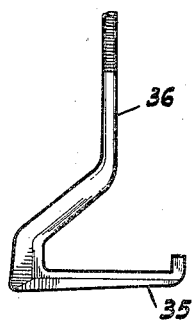
FIG. 4
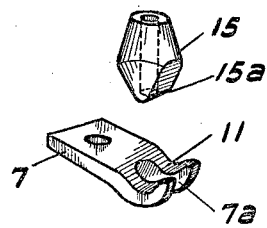
FIG. 5
FIG. 6
INVENTOR
RAISLEY B. M. BENNETT
BY
ATTORNEY Patented June 7, 1932

1,862,172

UNITED STATES PATENT OFFICE

RAISLEY B. M. BENNETT, OF LA JOLLA, CALIFORNIA

SPRING EXPANDER

Application filed June 10, 1931. Serial No. 543,373.

This invention relates to a tool for expanding or placing under tension a vehicle spring for the purpose of supporting said spring while certain repairs are being made to the vehicle.

An important object of the invention is to provide a tool to expand the rear vehicle spring of a "Model A" Ford automobile whenever there arises a necessity for uncoupling such spring from the rear axle. Such necessity occurs whenever it is necessary to repair or replace the spring hanger, to replace the spring bushing or spring perch, to repair the rear axle, and possibly to make other repairs pertaining to or connected with the aforementioned parts of the vehicle.

In conjunction with the above recited features, other objects of the invention are to provide an improved suspending or tensioning device, the upper end portion of which may readily be connected with the chassis of the vehicle while the lower end thereof is quickly and conveniently coupled to the end portion of the vehicle spring, the device being provided with means to contract its length against the opposition of the vehicle spring until such spring is placed under the desired tension and is expanded the required amount. When the vehicle spring has thus been expanded the desired repairs may conveniently be attended to, and when the repairs have been completed the device will hold the end portion of the vehicle spring in proper position for reshackling the same to the running gear.

Other objects, advantages and features of invention may hereinafter appear.

Referring to the accompanying drawing which illustrates what is at present deemed to be a preferred embodiment of the invention, Fig. 1 is a rear elevation of an automobile showing only so much thereof as is necessary to illustrate the application of the invention thereto.

Fig. 2 is an elevational view, showing the invention separately.

Fig. 3 is an elevational view of the device taken at right angles to Fig. 2.

Fig. 4 is an elevation of a modification showing the hook and eye-bolt in one piece.

Fig. 5 is a perspective view of the sleeve bracket.

Fig. 6 is a perspective view of the saddle member.

Referring in detail to the drawing, the device comprises a saddle bracket 7 which is adapted to be secured to the chassis 8 by means of the bolt 9 and nut 10 which screws on to the lower end of said bolt, said bolt 9 and nut 10 being a part of the construction of the "Model A" Ford automobile. In order to apply said saddle bracket to said bolt it is only necessary to unscrew the nut 10, place the apertured portion of the saddle bracket upon the lower end portion of the bolt with the seat 11 of the saddle directed upwardly and then screw the nut in place thus clamping the saddle bracket securely in the position shown in Fig. 1.

Said bracket 7 is designed to support a sleeve member 15 which slips on to the screw threaded eye-bolt 16. Said sleeve member 15 on its lower side is provided with a bulged, convexed or bluntly pointed face 15a which is so shaped as to cooperate in an advantageous manner with the seat 11 of the saddle bracket 7, which is bifurcated at 7a to receive the eye-bolt.

The upper end of the eye-bolt 16 has screwed thereonto a nut 19 which abuts against the upper end of the sleeve member 15 and thereby limits the upward movement of said sleeve member, the latter being freely slidable upon the eye-bolt.

The lower end of the eye-bolt is provided with the eye portion 20 whereby it is connected with the hook or stirrup 21 in a pivotal manner, that is to say in such a manner that the hook may freely swing from left to right and vice versa as viewed in Fig. 2.

The hook or stirrup 21 is preferably of an angular character, and is provided with a substantially straight bearing surface 25 which is adapted to underlie the outer end portion of the vehicle spring 26, said hook being so balanced as to automatically position the bearing surface thereof in position for proper engagement with the lower surface of said spring when upward force is directed to the hook. The outer end of the hook is provided with an upwardly directed lip 27 to prevent accidental displacement of the hook from the spring during the operation of the device.

The channel iron member 8a, which underlies the chassis 8, forms a secure support for the device when it is operated to apply tension to the vehicle spring 26, as is necessary when the shackle 30 is to be detached from the end of said spring preparatory to making repairs or replacing parts.

In Fig. 4 is shown a modified form of hanger member which may be substituted for the eye-bolt 16 and the stirrup 21. In this view the hook 35 is shown formed in one piece with the screw threaded shank 36. It is to be understood that the invention is not limited to the particular forms of the hanger bar shown, but that changes therein, within the scope of the appended claims, may be made without departing from the spirit of the invention.

In the operation of the device, when it is necessary to prepare for unshackling an end of the vehicle spring 26 from its support 35a, the nut 10 is first unscrewed from the bolt 9 and then the apertured portion of the bifurcated saddle bracket 7 is slipped over the lower end portion of said bolt, whereupon said nut is screwed back upon the bolt thus clamping the saddle bracket 7 into its operative position with the seat 11 thereof directed upwardly. The sleeve member 15 and its retaining nut 19 having previously been put in place upon the eye-bolt 16 near the unobstructed end of said bolt, the eye-bolt is slipped in between the bifurcations of the saddle bracket and the convex or bulged end of said sleeve 15 is seated upon the saddle bracket 7 as shown in Fig. 1 and, after the hook or stirrup member 21 has been swung so as to bring the bearing face 25 thereof underneath the end portion of the vehicle spring 26, the clamping nut 19 is rotated in a direction to apply tension to the vehicle spring to deflect it from the position shown in full lines in Fig. 1 to the position shown in dotted lines in said view. Thereupon the shackle 30 may be removed, the end portion of the spring 26 thereby being freed from the adjacent parts at that side of the vehicle. The spring is thus retained under tension until after the required repairs or replacements have been made. During the screwing down of the nut 19 to deflect the end portion of the vehicle spring upwardly there will be a slight rocking movement of the sleeve member 15 with relation to the saddle bracket 7, the convex or bluntly pointed nature of the sleeve 15 adapting it for this rocking movement, while the spring is being moved up from the full line position to the dotted line position of Fig. 1.

When the workman is ready to replace the shackle he will unscrew the nut 19 to whatever extent may be necessary in order to lower the end portion of the vehicle spring to a point where it will fit with exact nicety into the replaced shackle. Then by a slight farther lengthening of the device, by additional unscrewing of the nut 19, the hook or stirrup 21 will be completely released from the vehicle spring thus permitting the device to be removed.

I claim:

1. In a device of the kind described, a saddle bracket, means to attach said bracket to the rear cross member of an automobile chassis, and a hanger member comprising a saddle portion adapted to seat upon said saddle bracket and a hook member adapted to couple on to an end portion of the rear spring of the automobile, said hanger member comprising screw threaded parts adapted to contract its length in opposition to the vehicle spring.

2. In a device of the kind described, a saddle bracket, means to attach said bracket to the rear cross member of an automobile chassis, and a hanger member comprising a saddle portion adapted to seat upon said saddle bracket and a hook member adapted to couple on to an end portion of the rear spring of the automobile, said hanger member comprising screw threaded parts located above and operating against said saddle and adapted to lift said hanger member against the opposition of the vehicle spring.

3. In a device of the kind described, a bifurcated saddle bracket the bifurcation of which extends into the seat provided by the saddle, and a hanger member comprising a sleeve member having a bulged lower surface adapted to engage in a rocking manner the seat provided by said saddle, said hanger member being adapted for detachable connection with the rear automobile spring and also being provided with means to contract its length against the opposition of said spring, said hanger member being insertible into the bifurcation of said saddle bracket to bring said sleeve member over the seat of said saddle.

4. In a device of the kind described, a bracket having a saddle portion provided with a bifurcation which enters the seat afforded by said saddle portion; and a hanger member comprising a bolt the diameter of which adapts it for lateral insertion into said bifurcation; and means mounted upon said bolt and adapted to seat upon said saddle to support the bolt in a swinging manner thereupon, said bolt being provided below its said supporting means with means to attach it to the end portion of a vehicle spring.

5. In a device of the kind described, in combination, a hanger adapted to be detachably connected with the end portion of a vehicle spring, a supporting member carried by said hanger, a saddle bracket upon which said supporting member is adapted to seat, said saddle member comprising a bifurcated portion at one end adapted to receive said hanger member and thereby admit said supporting member to said seat, and an apertured portion at its other end adapted to receive a bolt.

RAISLEY B. M. BENNETT.